WAFFLE IRON MEMORY WITH MAGNETIC TAPE OVERLAY

Filed Sept. 1, 1964

INVENTORS A. H. BOBECK
J. L. SMITH
BY Herbert M. Shapiro
ATTORNEY 3,401,381

WAFFLE IRON MEMORY WITH MAGNETIC TAPE OVERLAY

Andrew H. Bobeck, Chatham, and James L. Smith, Bedminster, N.J., assignors to Bell Telephone Laboratories, Incorporated, New York, N.Y., a corporation of New York Filed Sept. 1, 1964, Ser. No. 393,545
4 Claims. (Cl. 340—174)

Figure 1:
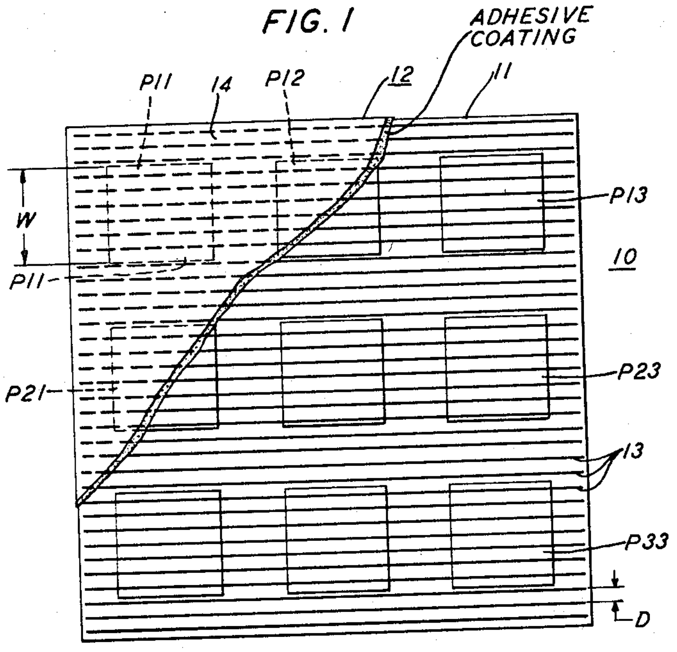

This invention relates to magnetic memories and, more particularly, to magnetic memories of a type including a relatively low reluctance base plate having posts thereon and an overlay of substantially rectangular hysteresis characteristics juxtaposed with the posts.

Memories having the above general magnetic structure are commonly termed "waffle iron" memories and are disclosed in our copending application, Ser. No. 215,318, filed Aug. 7, 1962, now U.S. Patent 3,274,571, which application may be considered incorporated herein by reference. Such memories are constructed in relatively large planes over which the magnetic characteristics, such as the coercive force and the relative squareness, of the overlay are believed to vary appreciably as will be explained hereinafter. Since variations in magnetic characteristics limit operating margins and lead to output pulses of varying amplitudes, considerable effort and expense are expended, normally, to fabricate, for such memories, overlays with suitable homogeneity of magnetic characteristics.

Further, there is, at present, no practical technique for ascertaining whether or not such an overlay has suitably homogeneous magnetic characteristics before the overlay is actually used. The reason for this is that the storage locations in each overlay, determined by the contact of the overlay with the posts, number in the hundreds or even in the thousands. Complete pretesting of such an overlay not only is an arduous task but also is destructive because it requires the overlay to be cut into strips, each including a row or column of bit locations in order to determine the magnetic characteristics therealong. A representative one of a batch of overlays is tested in this manner. From a practical standpoint, however, this procedure is unproductive because, inter alia, the strain introduced by such cutting changes the characteristics to be measured. Alternatively, a traveling probe, shaped to reduce any demagnetizing fields that are present, may be used without destroying the overlay. This latter technique is, at present, not fully developed and would be, at best, time consuming. Accordingly, in practice, an overlay is merely fixed to the waffle iron posts and the resulting memory is operated. If defects appear, or if output pulses exhibited thereby vary beyond acceptable limits, the overlay is replaced by another. This procedure is obviously wasteful.

However an overlay might be tested, an acceptable prior art overlay exhibits output pulses which vary typically from 3.0 to 12.0 millivolts or about 400 percent. Although this variation may not be due solely to the lack of homogeneity in the magnetic characteristics of the overlay, it is certainly indicative of such a lack.

It is an object of this invention to provide a new and novel waffle iron structure including an overlay wherein a relatively high degree of homogeneity of magnetic characteristics is provided inexpensively and wherein testing of the magnetic characteristics for the overlay may be carried out prior to the fabrication of the overlay.

The above and further objects of this invention are realized in one embodiment thereof wherein a plurality of magnetic tapes, of a material having substantially rectangular hysteresis characteristics, are spaced apart on a nonmagnetic adhesive film distances small with respect to the width of the posts of the waffle iron structure.

In this connection, magnetic tape has been developed with suitable homogeneity of magnetic properties for use in wrapping along a helical path on conductive "twistor" wires in "twistor" memories of the type described in Patent No. 3,083,353 of A. H. Bobeck, issued Mar. 26, 1963. Such tape, is, for example, commercially available Molypermalloy, an alloy of molybdenum, nickel, and iron, having a typical relative squareness of $0.9 \pm 0.05$ and a typical coercive force of 4.0 oersteds $\pm 0.1$.

Magnetic tapes for an overlay in accordance with this invention are pretested in the same manner in which twistor tapes are tested. Specifically, the tapes are fed through two coils to one of which test pulses are applied. The second of the coils exhibits, in response, pulses providing a continuing indication of the magnetic characteristics of the tape as it is fed through the coils. Thus, the magnetic characteristics of the tapes used for any particular overlay may be maintained within desired limits.

Accordingly, a feature of this invention is a plurality of discrete magnetic tapes spaced apart on an adhesive coated nonmagnetic film distances small compared to the width of the posts of a waffle iron memory with which it is juxtaposed.

Figure 2:
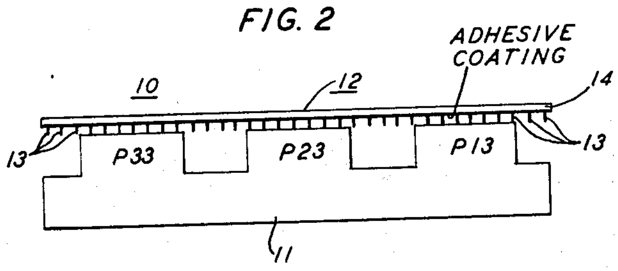

The foregoing and other objects and features of this invention will be more fully understood with reference to the following detailed description rendered in conjunction with the accompanying drawing, wherein:

FIG. 1 is a top view, partially cut away, of a waffle iron structure including an overlay in accordance with this invention; and FIG. 2 is a side view of the structure of FIG. 1.

Specifically, FIG. 1 shows a waffle iron structure 10 including a relatively low reluctance base plate 11 having a plurality of posts P arranged, illustratively, in rows and columns thereon. Each post designation includes numerals corresponding to the row and column, respectively, in which it is positioned. An overlay 12 is juxtaposed with the posts P. The overlay 12 comprises a plurality of magnetic tapes 13, of a material having substantially rectangular hysteresis characteristics, spaced apart on an adhesive coated film 14 distances D small compared to the width W of a post P. The tapes, essentially, contact the posts as shown in FIG. 2 for providing magnetically retentive flux paths between posts therealong. In this connection, the tapes may be placed on the surface of the adhesive film as shown in FIG. 2, or, alternatively, may be imbedded in the film with only the surfaces of the tapes exposed.

The amount of flux switched through a waffle iron post, as is well known, is a function of the width W of the post. The number of magnetic tapes contacting each post is accordingly chosen, depending on the flux-carrying capacity of each tape, to correspond to the amount of flux switched through the posts. That is to say, the flux-carrying capacity of the tapes contacting a post is chosen less than that of the post contacted by the tapes. This choice is made to avoid switching, in the tapes, more flux than can be accommodated by the post.

The orientiation of the magnetic tapes is in the direction of flux, that is, along the rows of posts for flux switched between, for example, post P11 and post P12. Thus, it is clear that, for all practical purposes, such overlays as shown do not permit the diagonal switching of flux, for example, from post P21 to post P12. Nor will an overlay in accordance with this invention permit flux switching between adjacent posts in a column without a reorientation of the tapes in the direction of the column.

The description of a particular mode of wiring a waffle iron structure to obtain flux switching as described is not necessary for an understanding of this invention and, accordingly, is not described herein. Any such mode providing flux switching along the magnetic tapes of the overlay in accordance with this invention may be used.

Suitable wiring modes are described in our aforementioned application and are now well known in the art.

It is clear from the foregoing discussion that the magnetic tapes need not be spaced equal distances apart nor that they be present except between posts between which flux is switched. Moreover, the tapes need not be of like sizes, that is, cross-sectional areas. Equal spacings, like sizes, and uniform distribution of the magnetic tapes, however, are conveniently and inexpensively achieved by automatic techniques, and problems of registration between tapes and posts are avoided thereby.

In one specific embodiment, magnetic tapes 3.0 mils wide and 0.33 mil thick were spaced apart on 5.0 mil centers on an adhesive coated Mylar film 2.0 mils thick. In this connection, any adhesive may be used, and it is, conveniently, applied in thin layers to avoid squeezing out around the tapes. The waffle iron posts were 50.0 mils wide by 30.0 mils long spaced 30.0 mils apart. The tapes were tested prior to the fabrication of the overlay and were found to have the characteristics substantially as described for such tapes hereinbefore. Waffle iron memories including such overlays exhibit output pulses varying about 15 percent. Since a plurality of tapes provide a flux path between each pair of posts, even slight differences within the acceptable limits between the characteristics of the tapes are averaged out for the flux switched. Variations of less than 15 percent are frequently achieved.

An overlay in accordance with this invention is made by fixing adhesive nonmagnetic tape of, for example, Mylar, or, alternatively, copper, to a mandrel and laying the magnetic tapes in side-by-side relationship thereon conveniently by means of a conventional coil winding machine. Subsequently the layer is removed and cut to the desired size. Typically, a square mandrel is used each side of which is of a size equal to the desired size of the overlay. Adhesive coated nonconducting layers (Mylar) are used if it is desired to avoid eddy current damping of flux switched during the operation of the resulting memory.

It is to be understood that what have been described are considered to be only illustrative embodiments of the present invention and various and numerous other arrangements may be devised by one skilled in the art without departing from the spirit and scope of this invention.

What is claimed is:

1. In combination, a relatively low reluctance base plate having a plurality of posts thereon, said posts having a prescribed width, and an overlay juxtaposed with said posts, said overlay comprising a plurality of magnetically retentive tapes on a nonmagnetic adhesive film, said tapes being spaced apart fixed distances small compared with said prescribed width.

2. In combination, a relatively low reluctance base plate having a plurality of posts thereon, said posts having a prescribed width, and an overlay juxtaposed with said posts, said overlay comprising a plurality of magnetically retentive tapes on a nonmagnetic adhesive film, said tapes being spaced apart fixed substantially equal distances small compared with said prescribed width, said tapes having equal widths.

3. In combination, a relatively low reluctance base plate having a plurality of posts arranged generally in rows and columns thereon, said posts having a prescribed width, and an overlay juxtaposed with said posts, said overlay comprising a plurality of like magnetically retentive tapes on a nonmagnetic adhesive film, said tapes being spaced apart fixed distances small compared with said prescribed width, said tapes being oriented in the direction of said rows and providing flux paths between adjacent posts in said rows.

4. A combination in accordance with claim 3 wherein said nonmagnetic adhesive film is electrically nonconducting.

References Cited

UNITED STATES PATENTS 3,308,449 3/1967 Uemura ---------- 340—174.1

BERNARD KONICK, *Primary Examiner.*

V. P. CANNEY, *Assistant Examiner.*